(12) United States Patent
McDonald

(10) Patent No.: US 10,655,758 B2
(45) Date of Patent: May 19, 2020

(54) HOSE CARRIER

(71) Applicant: Dustin McDonald, Hiram, GA (US)

(72) Inventor: Dustin McDonald, Hiram, GA (US)

( * ) Notice: Subject to any disclaimer, the term of this patent is extended or adjusted under 35 U.S.C. 154(b) by 0 days.

(21) Appl. No.: 16/503,919

(22) Filed: Jul. 5, 2019

(65) Prior Publication Data
US 2019/0390798 A1   Dec. 26, 2019

Related U.S. Application Data

(63) Continuation-in-part of application No. 16/013,897, filed on Jun. 20, 2018, now Pat. No. 10,384,088.

(51) Int. Cl.
| F16L 3/00 | (2006.01) |
| F16L 3/16 | (2006.01) |
| F16L 3/02 | (2006.01) |
| F16L 3/10 | (2006.01) |
| B60B 19/12 | (2006.01) |

(52) U.S. Cl.
CPC .............. *F16L 3/16* (2013.01); *F16L 3/02* (2013.01); *F16L 3/1025* (2013.01); *B60B 19/12* (2013.01); *F16L 3/1041* (2013.01); *F16L 3/1066* (2013.01)

(58) Field of Classification Search
CPC ..... F16L 3/003; F16L 3/26; F16L 3/00; F16L 3/02; F16L 3/1075; F16L 3/12
USPC ...................... 248/68.1, 74.1, 75, 80, 83, 87
See application file for complete search history.

(56) References Cited

U.S. PATENT DOCUMENTS

| 5,027,478 A * | 7/1991 | Suhr ...................... B65H 75/36 137/355.16 |
| 7,527,227 B1 * | 5/2009 | Mondello .............. A62C 33/00 242/615.2 |
| D597,403 S * | 8/2009 | Ho ................................. D8/356 |
| 10,128,641 B2 * | 11/2018 | Cuppen ..................... H02G 3/32 |
| 2001/0028021 A1 * | 10/2001 | Martin ................... B65H 57/14 248/87 |
| 2013/0187012 A1 * | 7/2013 | Blakeley .................. H02G 3/32 248/68.1 |
| 2014/0259620 A1 * | 9/2014 | Hicks ...................... F16L 3/223 29/525.01 |
| 2015/0048222 A1 * | 2/2015 | Eley ........................ A01G 9/28 248/87 |

* cited by examiner

*Primary Examiner* — Steven M Marsh
(74) *Attorney, Agent, or Firm* — Lamon Patent Services; Cynthia S Lamon

(57) ABSTRACT

An apparatus provides rolling support for a hose or conduit, and has a single first inner base frame element with outward extending arms for carrier wheels, open on one side, and having male projections extending on both ends in the direction of an axis of the cylindrical shape, two outer base frame extending carrier wheels, each having a side opening, and a bore in the axis direction on one end only, sized to engage one of the male projections of the inner base frame element, and cam operated mechanisms enabling the base frame elements to be joined, capturing the hose or conduit, and presenting roller wheels outward upon which the hose or conduit is carried.

10 Claims, 18 Drawing Sheets

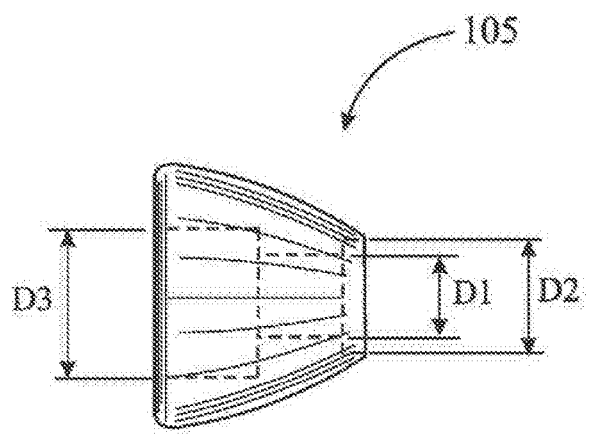
*Fig. 4*
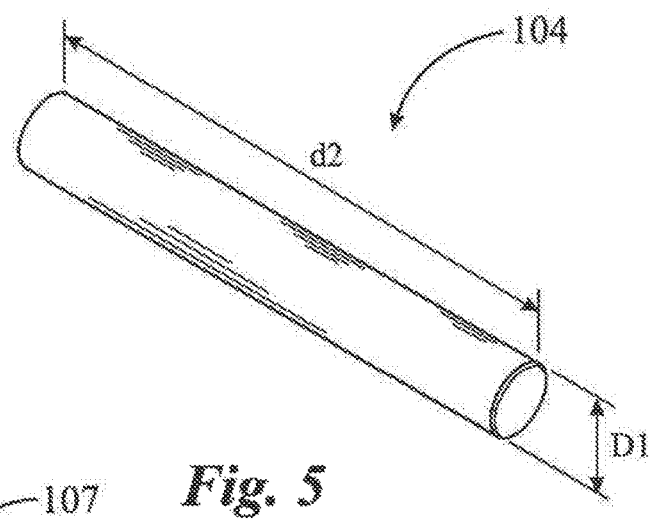
*Fig. 5*
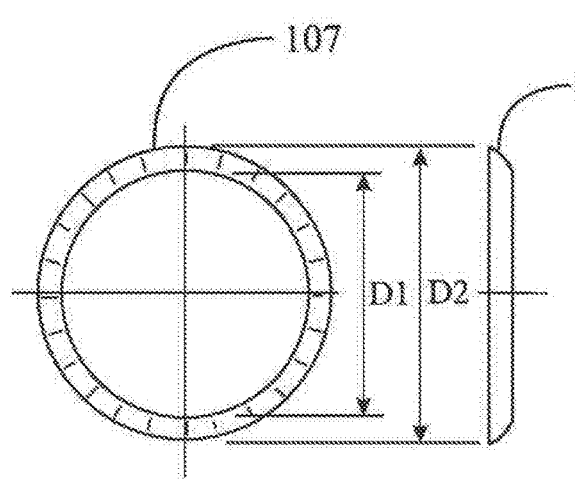
*Fig. 6A*     *Fig. 6B*

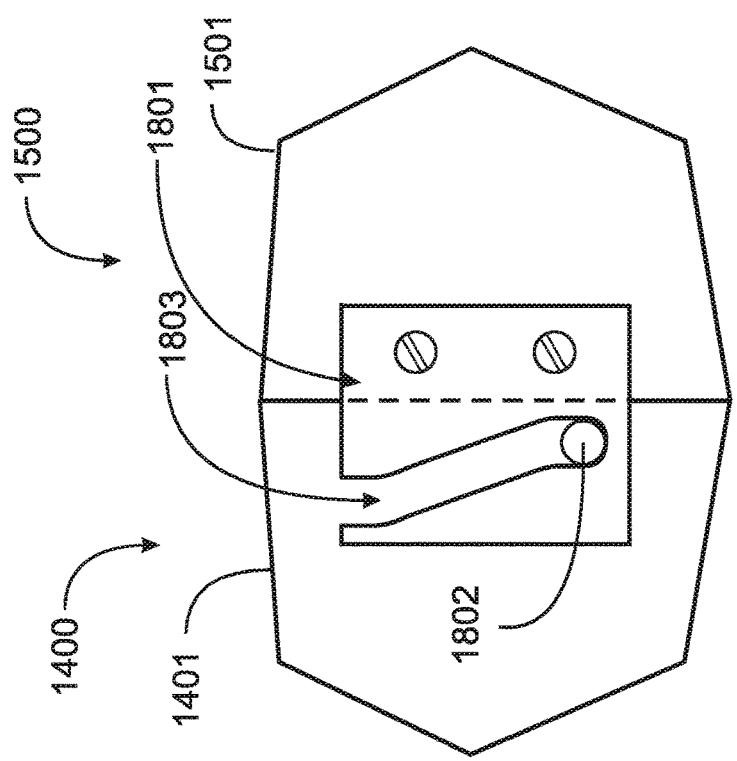
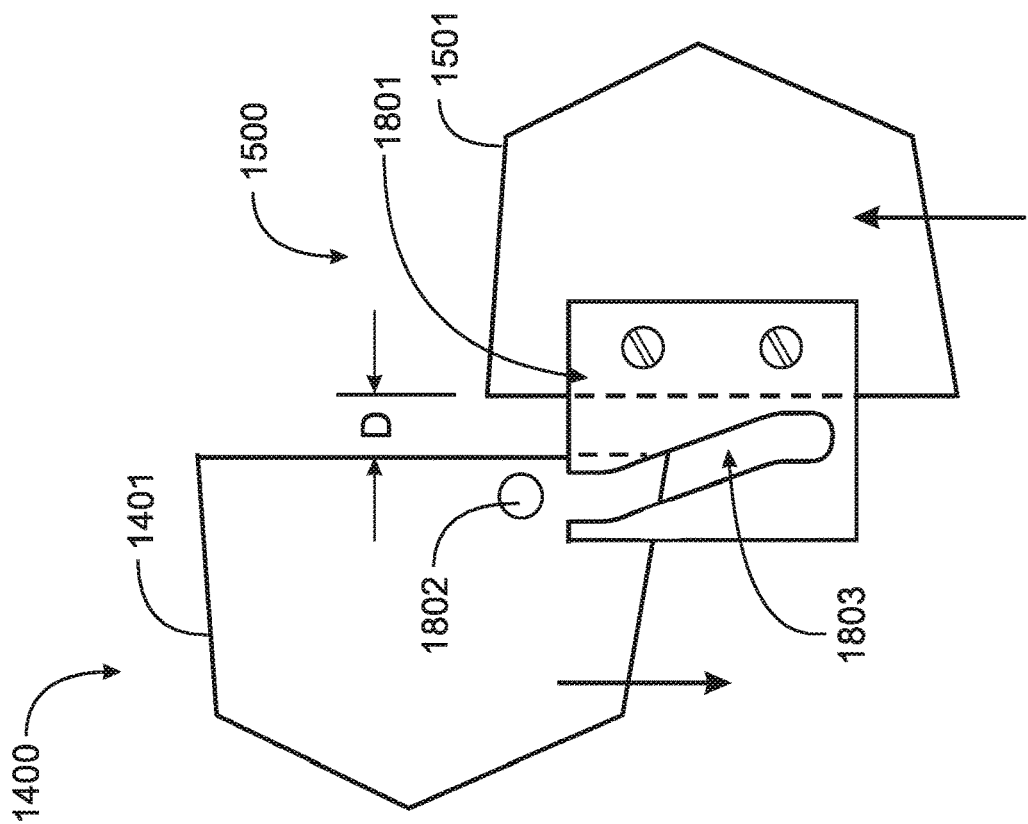
Fig. 18B
Fig. 18A

HOSE CARRIER

CROSS-REFERENCE TO RELATED APPLICATIONS

The present application claims priority to a U.S. application Ser. No. 16/013,897, filed Jun. 20, 2018, which claims priority to U.S. application Ser. No. 15/784,115, filed Oct. 17, 2017, which claims priority to provisional patent application, 62/414,350, filed Oct. 28, 2016, and all disclosure of the parent applications is incorporated herein at least by reference.

BACKGROUND OF THE INVENTION

1. Field of the Invention

The present invention is the technical area of mechanical devices for reducing friction, and pertains more particularly to a device for reducing friction and drag for hoses and other conduits, when moving such conduits over supporting surfaces.

2. Description of Related Art

It is well known in the art that there are many pressing needs for moving a relocating hoses and other conduits in many different circumstances. Hoses in gardening and landscaping applications, for example, typically must be connected at a head end to a hose spike, or other source of water, and must be moved to a point of application that may be quite remote from the source. Further, a hose may need to be moved frequently to other points of application, such as to water specific plants. As another example, heavy hoses in firefighting applications need to connect at a source end, and must be moved to point of application for fighting such as brush fires and structure fires. Ability to move and relocate hoses is critical to success in fighting a fire of any sort.

There exist, at the time of filing the present application, no specific solution for the problem of moving hoses and other conduits over ground or structural surfaces other than just picking up the hose, or a portion of the hose and carry it to a different location. Therefore, what is clearly needed is a device or implement that may pair with a hose or conduit in a plurality of positions, providing rollers between the hose or conduit and surfaces upon which the hose may travel.

BRIEF SUMMARY OF THE INVENTION

One embodiment provides an apparatus providing rolling support for a hose or conduit, comprising a single first inner base frame element implemented in a substantially cylindrical shape with outward extending projections having mounting bores for carrier wheels. The base frame element may be open on one side sufficiently to place the frame element over the hose or conduit to be carried. The base frame element also includes male projections extending on both ends in the direction of an axis of the cylindrical shape.

In this embodiment two outer base frame elements are provided including outward extending projections having mounting bores for carrier wheels, each outer base frame element having a side opening to accommodate the hose or conduit, and a bore in the axis direction on one end only, sized to engage one of the male projections of the inner base frame element.

A cam operated mechanisms are implemented proximate the ends of the inner and the outer base frame elements, in this embodiment, enabling the base frame elements to be joined, capturing the hose or conduit, and presenting roller wheels outward upon which the hose or conduit is carried.

One embodiment provides that the inner base frame element includes female bores on opposite ends, rather than the male projections, and each of the outer base frame elements has on male projection on one end. In this embodiment, the cam operated mechanisms comprise two connector posts implemented on each one of the outer base frame elements, the connector posts guided in bores in the direction of the axis, implemented in projections from a body of the outer base frame elements on opposite sides, the connector posts having cam fluted ends enabled to enter holes in projections on a body of the inner frame element, and to engage cam follower pins implemented in the holes, such that rotating the connector pins draws the base frame elements together. Additionally, the connector posts on an end opposite the cam fluted ends, are slotted to engage a tool for rotation of the connector posts and may have a key panel for use to grasp and turn the connector posts.

In an alternative embodiment, the cam operated mechanisms comprise cam elements having cam tracks implemented on an outer rim of the body of the inner base frame elements, two cam elements on each end of the inner base frame element, and on opposite sides about 180 degrees separated, the cam elements projecting outward from the end of the inner base frame element such that an entrance to each cam track is positioned to engage a cam follower pin projecting outward from the body of the outer base frame element, rotating the base frame elements serving to engage the cam roller pins in the cam tracks, drawing the inner and outer base frame elements together.

In the above embodiment, the cam elements with cam tracks are implemented on the outer base frame elements, and the cam follower pins are on the inner base frame element. An optional addition in this embodiment includes rigid foam or rubber-like elements placed between the inner and the outer base frame elements, compression of the rubber-like elements in assembly providing force and friction in the cam elements to facilitate retention of the connection. Additionally, the rubber-like elements comprise projections inward toward the hose or conduit, and facilitate use of the apparatus with hoses and conduits of differing diameters. This embodiment may also provide that the inner base and each outer base have three outward extending projections with carrier wheels, with the carrier wheels oriented in a variety of orientations to provide rolling motion in the variety of directions.

BRIEF DESCRIPTION OF THE SEVERAL VIEWS OF THE DRAWINGS

FIG. 4 is a side elevation view of a single roller of the roller assembly of FIG. 1.

FIG. 5 is a perspective view of an axle rod from the roller assembly of FIG. 1.

FIG. 6A is a face-on view of a retainer element from the roller assembly of FIG. 1.

FIG. 6B is a side view, in section, of the retainer element of FIG. 1.

FIGS. 18A and 18B depict interaction between a connection pin on one base frame element and a cam track on another frame element.

DETAILED DESCRIPTION OF THE INVENTION

Figure 1:
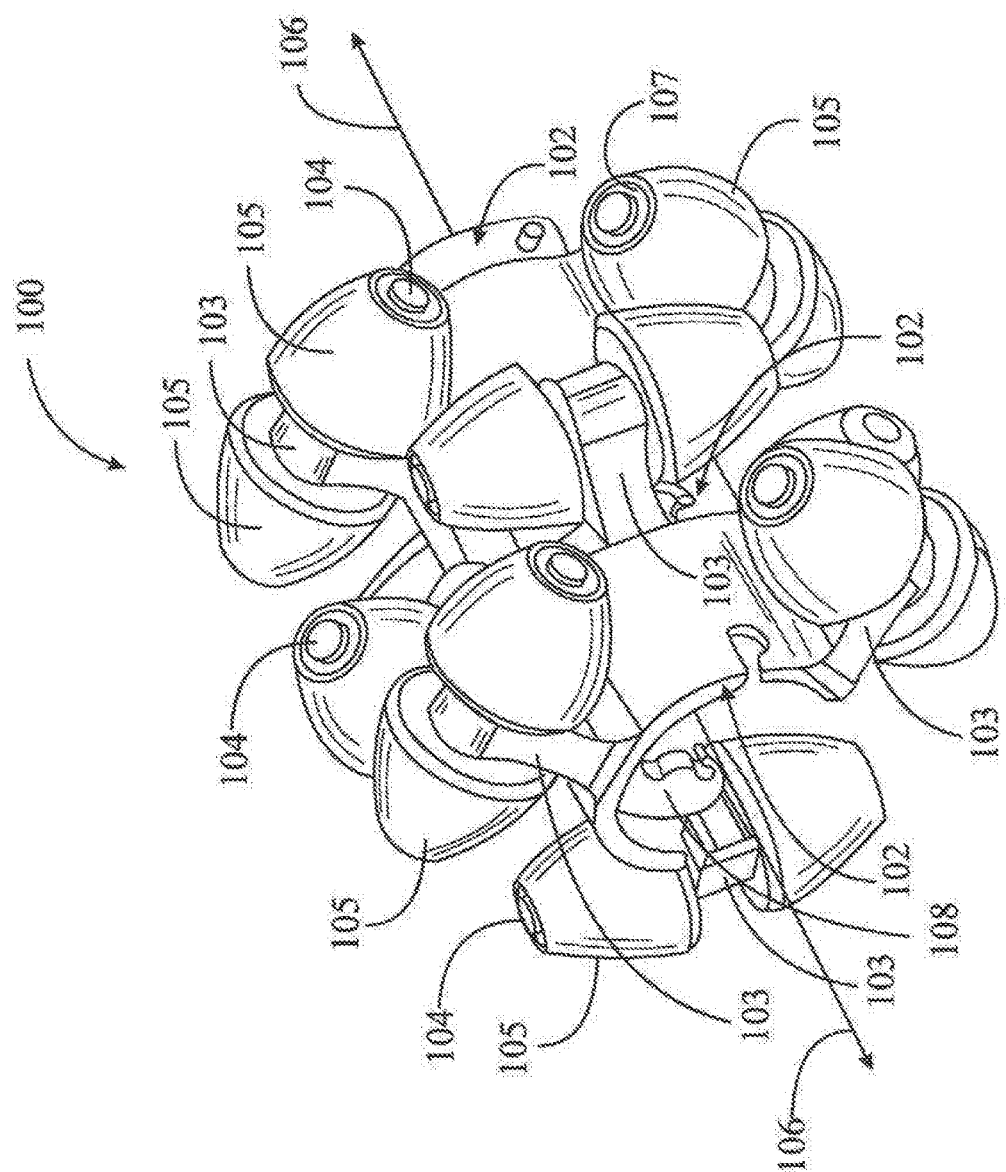
FIG. 1 is a perspective view of a roller assembly providing roller support for a hose or conduit in one embodiment of the invention.

FIG. 1 is a perspective view of a roller assembly 100 providing roller support for a hose or conduit in one embodiment of the invention, a plurality of such assemblies, attached to and spaced apart along a length of a hose or conduit, enabling the hose or conduit to move easily over any supporting surface, or around or over any restraining obstacle. Roller assembly 100 comprises, in this implementation, three connected bases 102, connected in a manner that they may entrain a hose along an axis direction 106, each base 102 having three appendages 103, each appendage 103 providing a bore mounting an axle rod 104, with each axle rod 104 providing a mount for two rollers 105, one on each side of the appendage 103. This arrangement provides a total of eighteen rollers, facing in different directions, such that a plurality of rollers will be in contact with any supporting surface or obstacle at any point in time.

In FIG. 1 not every instance of every element is provided with an element number and a witness line, for to do so would obstruct the understanding of the figure, but the skilled person will realize the repetition of elements.

Figure 2:
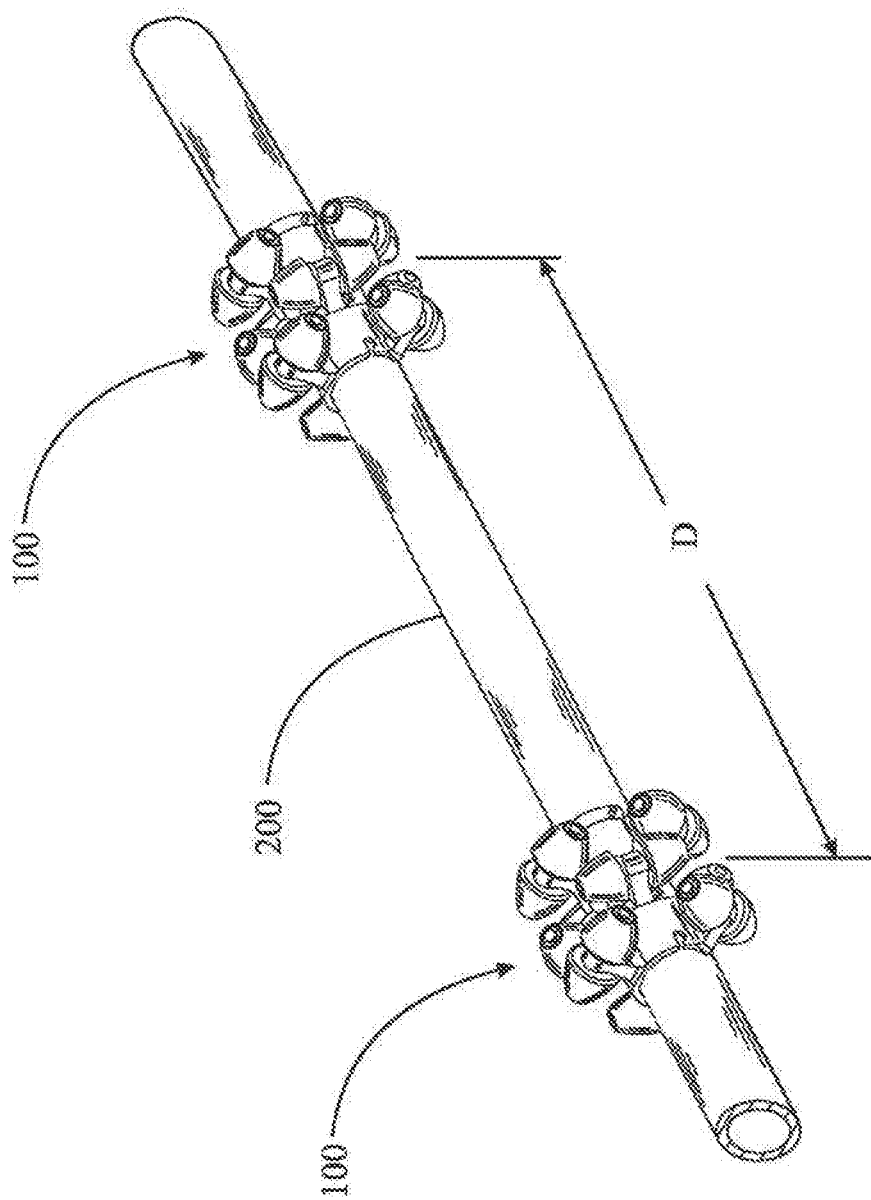
FIG. 2 is a perspective view of two roller assemblies carry a hose in an embodiment of the invention.

FIG. 2 is an exemplary view of a relatively short section of a hose 200, upon which two roller assemblies 100 have been entrained, spaced apart by an arbitrary distance D along a length of the hose. This arrangement is exemplary of a minimum implementation of the invention. In practice a practical hose in use in an embodiment of the invention might have a considerable plurality of roller assemblies spaced along the length of the hose. The spacing is also a matter of specific use, as the necessary spacing to carry the weight of a hose, and to operate to move the hose in a relatively frictionless manner across supporting surfaces, such as bare earth, grass, gravel, concrete driveways, wooden decks, and the like, may well be a function of the size and weight of the hose, and also nature of the supporting surface and any obstacles to movement of the hose.

The skilled person will realize that weight of the hose is primarily supported in part by each of the roller assemblies, and that the dimensions of elements of the roller assembly is dependent, at least in part, on the size and material of the hose, or other conduit that may be carried by roller elements in embodiments of the invention.

Figure 3:
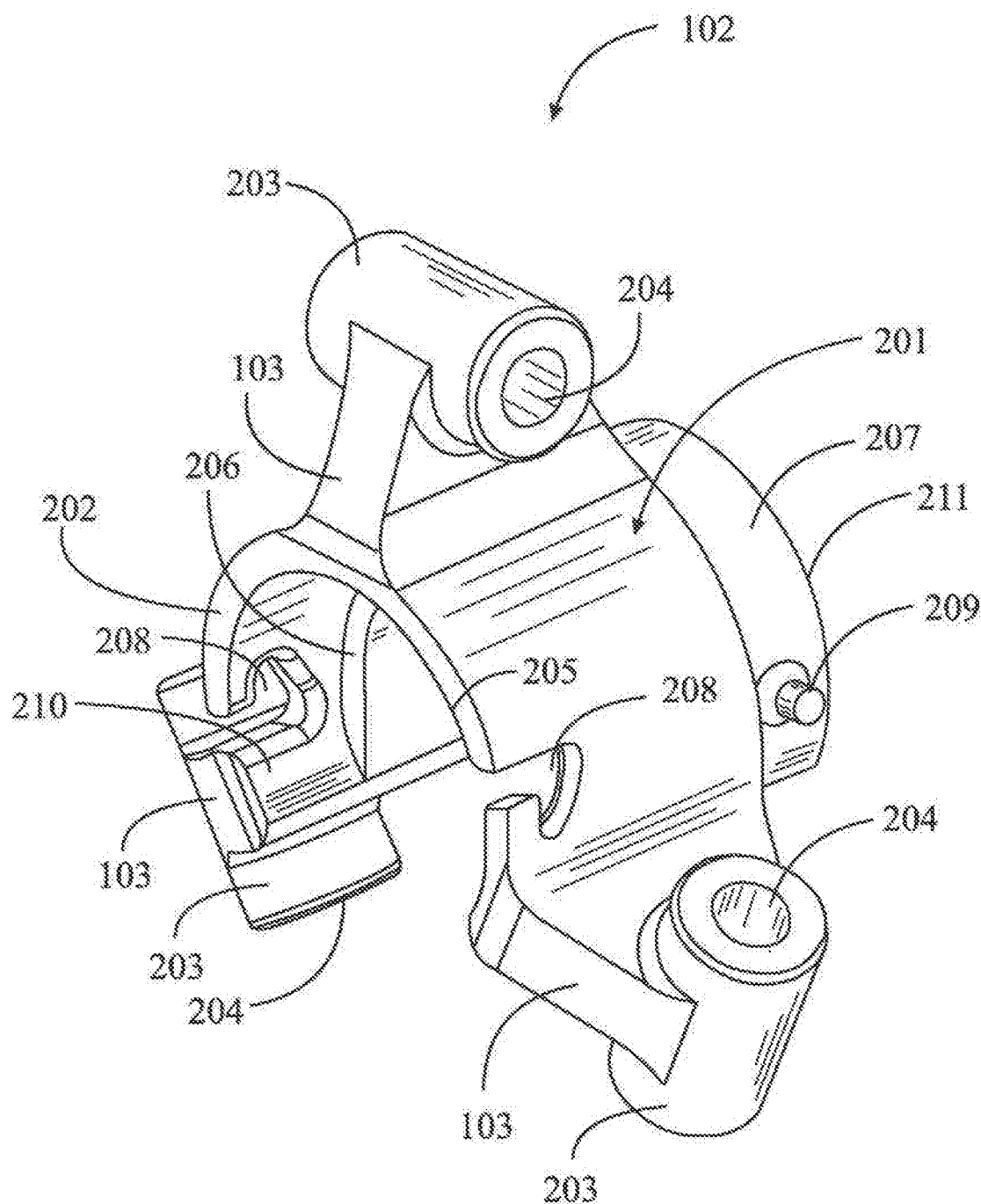
FIG. 3 is a perspective view of a single frame element in the roller assembly of FIG. 1.

FIG. 3 is a perspective view of a single frame element 102 in the roller assembly of FIG. 1. Frame element 102 comprises a partially circular body 201, open on one side, which may be placed over a hose or conduit. Body 201 has three appendages 103, spaced around the circular body in sixty-degree intervals, that each terminate on an axle-mounting element 203 having a bore 204 that has an axis that is orthogonal to a lengthwise axis of the circular body.

Circular body 201 has a female end 202 having an inner diameter 205, and a male end 207 having an outer diameter that provides a slip fit with the inner diameter of the female end, such that two such frame elements may be joined in part by engaging the male end of one into the female end of the other, aligning the two along the lengthwise axis of each. There is a shoulder 206 that serves to limit the degree of engagement of one frame element with a next frame element. Pins 209 are provided on the male end (one visible in FIG. 3), and locking grooves 208 are provided on the female end, through sidewalls of the circular body, such that, as one element is engaged in a next element in line, a rotation serves to lock the one to the other. Assembly of multiple frame elements to one another to provide a roller assembly, and engagement of the assembly to a hose or other conduit in the assembly process is described below in enabling detail.

A frame element 102 in one embodiment of the invention is an injection-molded element machine finished in some aspects. For example, it is typical of injection-molded objects like frame element 102, that there will some molding flash to be removed, which may be done manually, or may be done by tumbling a quantity of molded elements in barrels filled with abrasive material. In some cases further tumbling may be implemented to polish the outer surfaces of the molded elements. Finished frame elements may have bores 204 finished to size by a boring tool. In alternative embodiments such frame elements may be die cast, and finished, or may be assembled from other elements.

FIG. 4 is a side elevation view of a single roller 105 of the roller assembly of FIG. 1. There are six of these rollers on a single frame element, and eighteen on a roller assembly combining three frame elements. Roller 105 in one embodiment is approximately cone-shaped, as shown, and may be injection molded, and machine finished. Material in one embodiment may be high-density polymer material, which has a very high coefficient for wear. In other embodiment the rollers may be machined from metal or plastic, and then coated with a high-density polymer to provide the desired wear characteristics.

In one embodiment roller 105 has a through bore of diameter D1, which is controlled to be a slip fit to an axle rod described below. The roller in use must rotate on the axle rod. A counter-bore of diameter D3 from a larger end is of a dimension to fit over the outside diameter of mounting element 203 at the end of each of appendages 103 of frame element 102. Another counter-bore at the smaller end of the roller, of diameter D2, is provided to accommodate a cinching collar described below, to hold the roller on the axle rod.

FIG. 5 is a perspective view of axle rod 104 of FIG. 1, which is of a length d2 sufficient to pass through bore 204 of mounting element 203 at the end of appendage 103, to engage two rollers 105, one on each side of each mounting element at the end of each appendage 103 of a frame element. The rollers are provided to rotate mainly on axle rod 104 by bore diameter D1. The axle rods in one embodiment are surface-hardened steel, and may be ground to final diameter.

FIG. 6A is a face-on view of a single cinching collar 107, and FIG. 6B is a side view of the cinching collar. This collar, in one embodiment is a commercially available element known in the art for performing the function of retaining elements on a shaft in assembly. The inside diameter D1 is actually a bit smaller than diameter D1 of the axle rod, so the cinching collar may be pressed onto the axle rod in assembly, and will hold the rollers in place. The outside diameter D2 of the cinching collar fits into the counter-bore D2 of the wheel in assembly.

Figure 7:
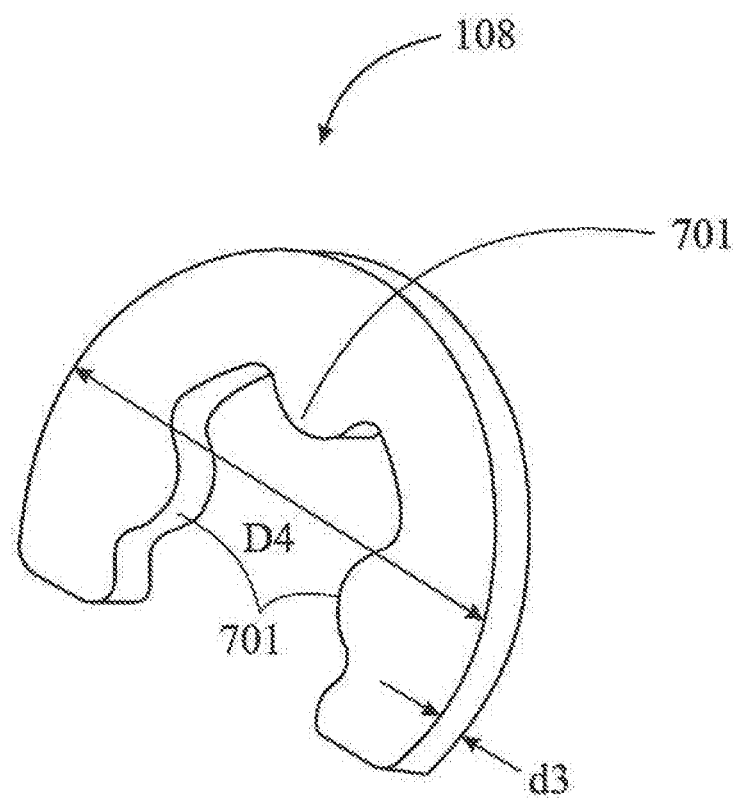
FIG. 7 is a perspective view of an assembly gasket from the roller assembly of FIG. 1.

FIG. 7 is a perspective view of an assembly gasket 108 from the roller assembly of FIG. 1. Referring now to FIG. 3, frame element 102 has shoulder 206 as a limit in female end 202. In assembly of one frame element to another gasket 108 is placed against shoulder 206, such that an end of the male end of another frame element will contact this gasket in assembly. Thickness d3 of gasket 108 is provided such that the gasket is compressed somewhat to align posts 209 with locking grooves 208, so as the frame elements are rotated in locking, the gasket provides a force against the locking grooves, that keeps the frame elements locked together. Gasket 108 has additional features 701 that engage a hose or conduit in a manner that the hose or conduit are gripped securely, even though there may be differences in diameter between individual hoses or conduits.

Figure 8:
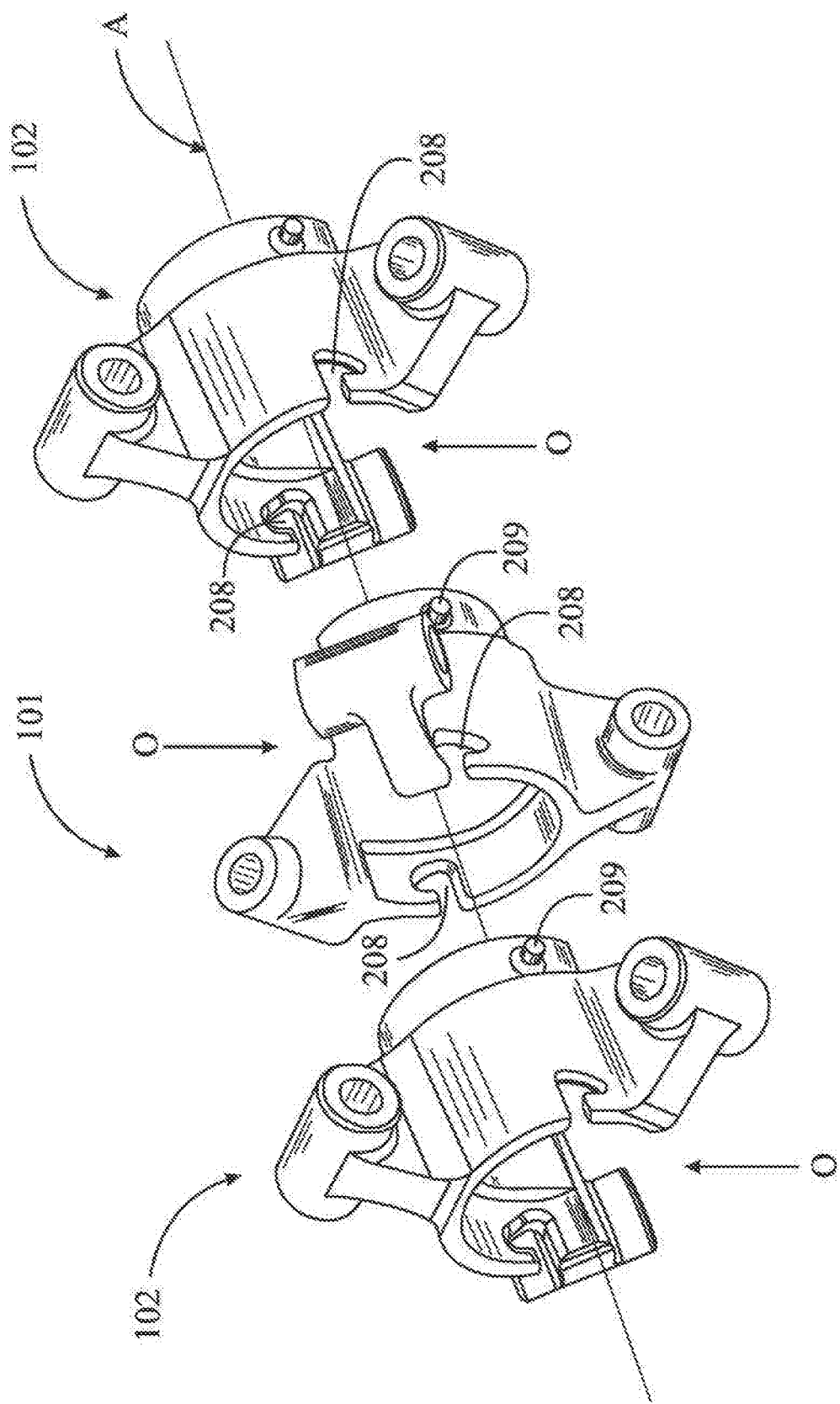
FIG. 8 is a perspective view of three frame elements aligned for assembly in an embodiment of the invention.

FIG. 8 is a perspective view of three frame elements 102 aligned for assembly to a hose or a conduit in an embodiment of the invention. The frame elements are identical. The only difference is that the frame elements on each end of the row of three are open from below, and the middle frame element is open from the top. The middle frame element is simply rotated 180 degrees around axis A, which is the axis of a hose or conduit to which the three frame elements may be engaged as assembles into a roller assembly, as shown in FIG. 1. Axle rods and rollers are not shown in FIG. 8, so the frame elements may better illustrate the relationship between the elements.

To engage one roller assembly 100 at one position along a hose or conduit, as may be seen in FIG. 2, a user will place one frame element 102, complete with axle rods and rollers, over the hose or conduit. This first frame element (furthest left in FIG. 8) will not securely engage the hose or conduit. The user will then place a second frame element, the middle element in FIG. 8, in place over the hose or conduit, rotated 180 degrees around axis A, next to the first element placed over the hose. A gasket 108 is placed in the second (middle) frame element, against shoulder 206 (see FIG. 3). The two frame elements are brought together along axis A, with the male end of the second frame element engaging the female end of the first frame element. Pins 209 of the first frame element engage the locking grooves 208 of the second frame element, requiring some force against gasket 108 to twist and engage, and when released, the gasket keeps the pins and locking grooves engaged.

Referring now to FIG. 7, illustrating gasket 108, projections 701 serve a function of compressing against the hose or conduit that is the object of the roller assembly, and enable roller assemblies of one size to be used with hoses and conduits of a variation in diameter.

It will be apparent to the skilled person that a roller assembly comprising two frame elements with axels and rollers will be relatively stable on a hose or conduit, and could be used to practice the invention, but that the roller assembly with three frame elements is more stable, and may be preferred.

In the embodiments thus far described, three frame elements, each with a side opening, are placed over a hose or conduit, and engaged with one another in a manner that the side openings are not aligned, which serves to engage the assembled frame elements to the hose or conduit. In an alternative embodiment, illustrated in perspective view in FIG. 9, a single frame element comprising two halves engaged by a hinge mechanism is used, such that the frame element may be unlatched and opened by rotating the parts relative to one another around the hinge element, than placed over the hose or conduit, closed and latched.

In the embodiment illustrated in FIG. 9 the frame is a single cylindrical unit 901, comprising two half-cylinder mirror image elements 902 and 903, separated along lines 910, joined in a manner described below such that the separate elements may be opened to join the roller assembly to a hose or a conduit, and then closed and latched. In this embodiment the appendages 103 and rollers 105 are arranged in the relationship shown and described above for the final assembly of the three frame elements as shown prior to FIG. 9, and the cylinder of the frame is split along lines that pass between the appendages for the rollers. The position of the split lines in FIG. 9 is exemplary, and not limiting, as the split lanes could be elsewhere, and not necessarily splitting the cylinder into equal halves.

Elements 904 are substantially half cylinder layers of foam rubber, or equivalent material, glued to the inside diameter of the halves on the cylindrical frame. These elements allow the roller assembly to be effectively joined to hoses or conduits of somewhat different diameters.

Figure 9:
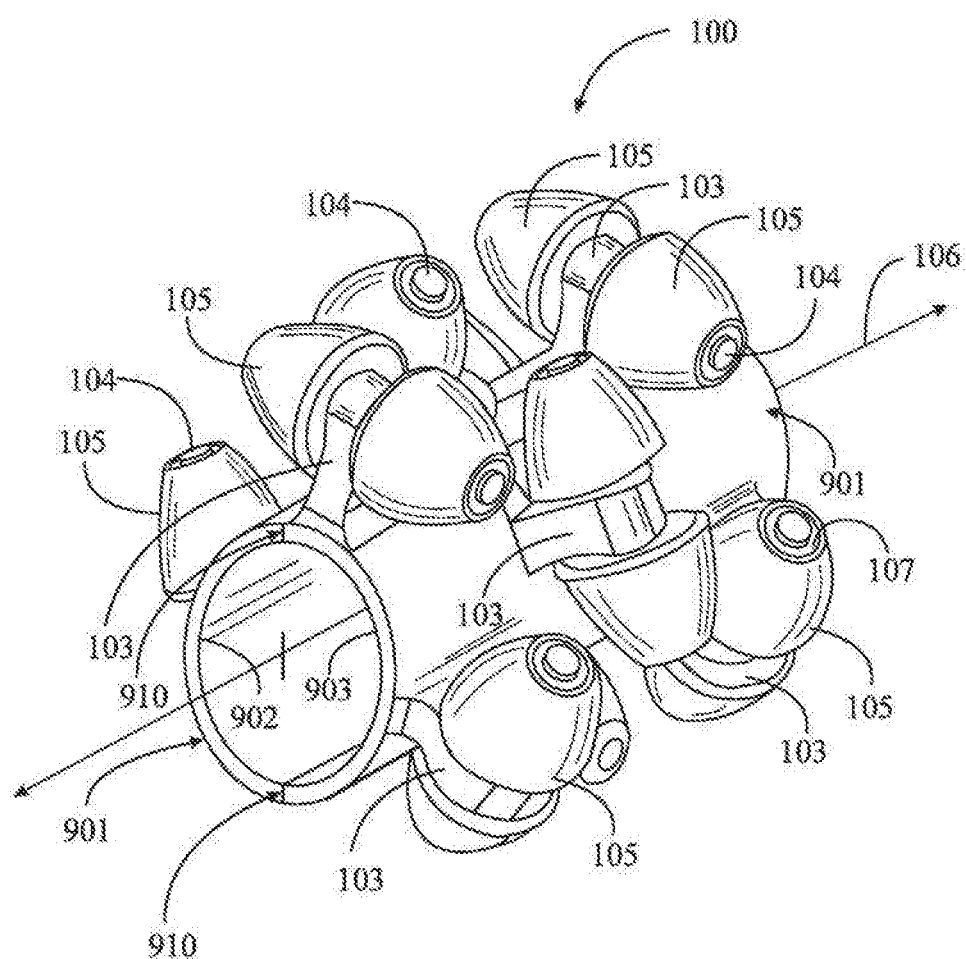
FIG. 9 is a perspective view of a roller assembly in another embodiment of the invention.
Figure 10:
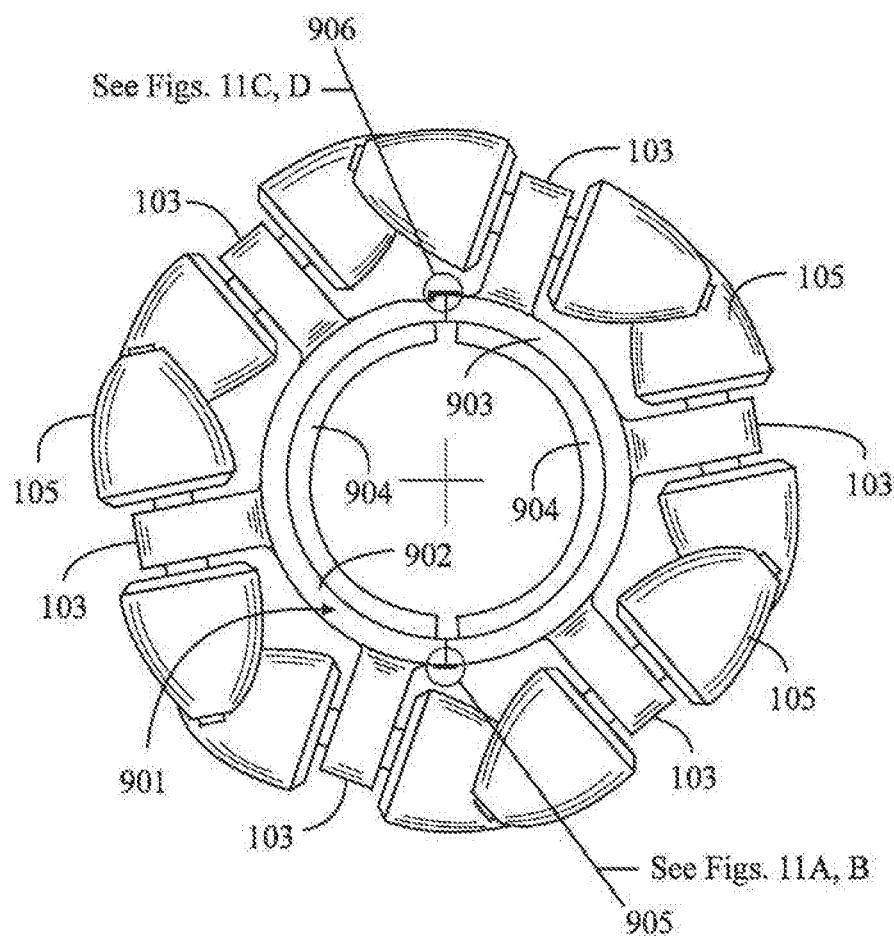
FIG. 10 is a straight-on end view of the roller assembly of FIG. 9.

FIG. 10 is a straight-on end view of the roller assembly of FIG. 9, showing an exemplary arrangement of a hinge 905 and a latch 906. In one embodiment the hinge is accomplished by a strip of fabric or thin, flexible plastic, that is heat welded or glued across the split line. As the two halves are pivoted relative to one another, the fabric allows the frame elements to pivot at the line where corners of the elements meet. In other embodiments physical and mechanical hinges of various sorts may be used. Hinge elements may be molded into the fame elements as well.

Figure 11A:
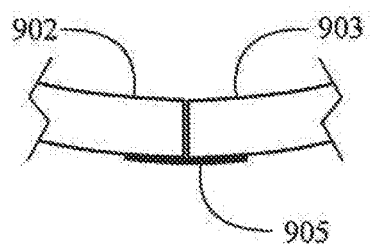
FIGS. 11A, 11B, 11C, and 11D illustrate hinge and fastening element in an embodiment of the invention.

FIGS. 11A, B, C, and D illustrate hinge and fastening element in an embodiment of the invention. FIG. 11 is a somewhat magnified view of the two frame elements and hinge element 905, with the frame closed. FIG. 11B shows the frame elements partly open such the thin strip hinge element 905 acts to hold the elements together as the assembly is opened and closed.

Figure 11C:
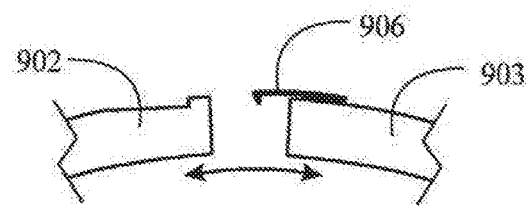
Figure 11B:
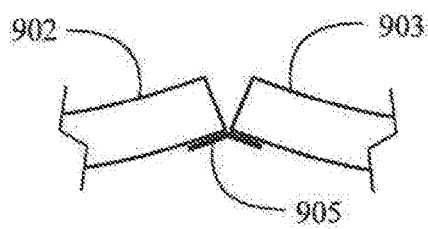

FIG. 11C shows a latch element 906 glued or heat welded to one of the frame elements, proximate the upper split line. Latch element 906 has a flexible arm with an angled, cantilevered end which latches to a groove machined into the opposite frame element as the two halves are rotated around the hinge to close the assembly, shown with the assembly open in FIG. 11C.

Figure 11D:
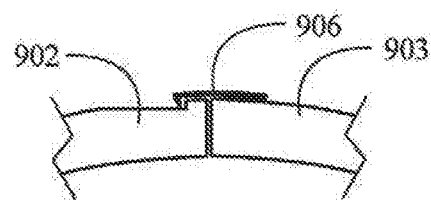

FIG. 11D shows the assembly with the two frame elements closed and latched. The frame elements may be implemented at specific places along a length of the cylindrical assembly.

Figure 12A:
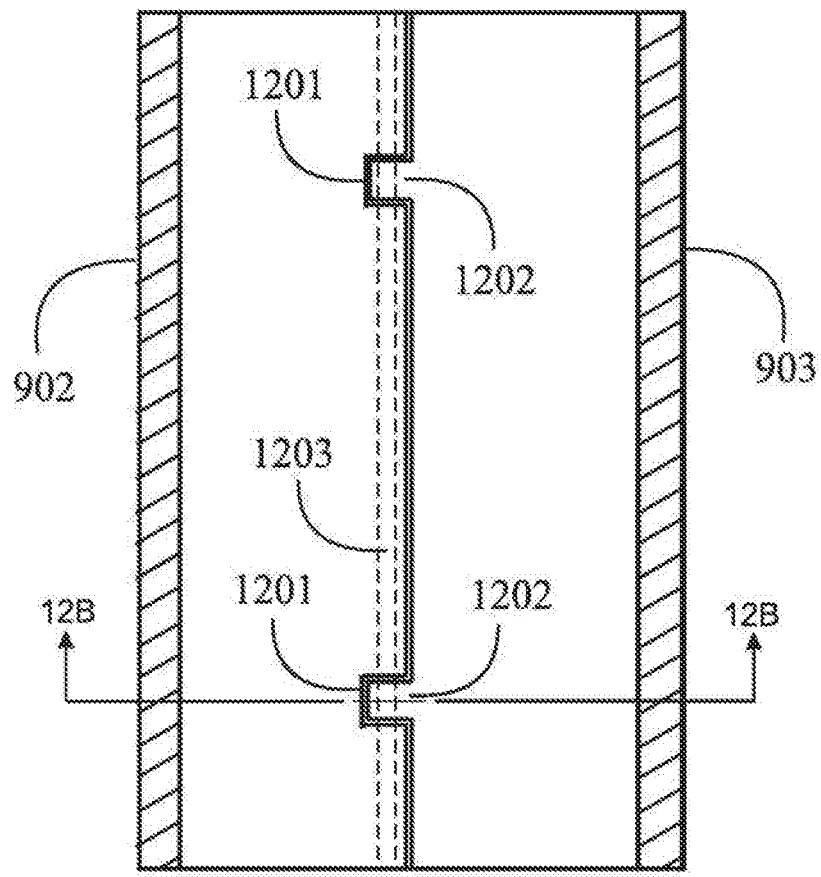
FIG. 12A is a section view of cylinder 901 illustrating hinges in an alternative embodiment.
Figure 12B:
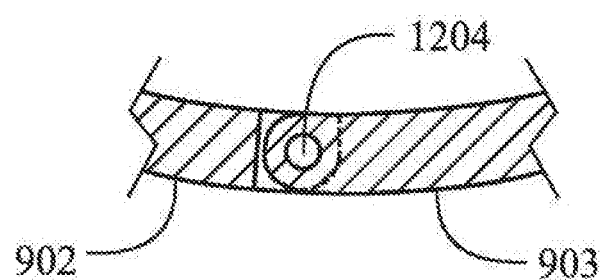
FIG. 12B is a partial section illustrating one of the hinges of FIG. 12A.

FIGS. 12A and 12B illustrate an alternative hinge mechanism. FIG. 12A is a section view of cylinder 901 illustrating two hinges implemented between half-cylinders 902 and 903 that comprise cylinder 901. In this implementation half-cylinder 902 has two rectangular notches 1201, and half-cylinder 903 has two rectangular appendages 1202, which are sized to fit into notches 1201 with clearance for rotation. A through bore 1203 is provided lengthwise to pass through portions of half-cylinder 902 and both appendages 1202. FIG. 12B is a partial section taken along section line 12B-12B of FIG. 12A, through half-cylinders 902 and 903, including one of appendages 1202. Pin 1204 is installed through bore 1203 to join the half-cylinders and complete the hinge mechanism. Bores through appendages 1202 are a few thousandths of an inch greater in diameter than through the body of half-cylinder 902, so the half-cylinders may rotate relative to one another, to open the body of the roller assembly.

The arrangement shown in FIGS. 12A and 12B, and described above, is exemplary. There may in other embodiments be more than the two hinge positions shown, and dimensions may vary. Further, in some embodiments separate pins may be installed for each hinge. The skilled person will understand that the notches and appendages may be implemented at positions along the length where there will be no interference with the appendages for roller assemblies.

Figure 13A:
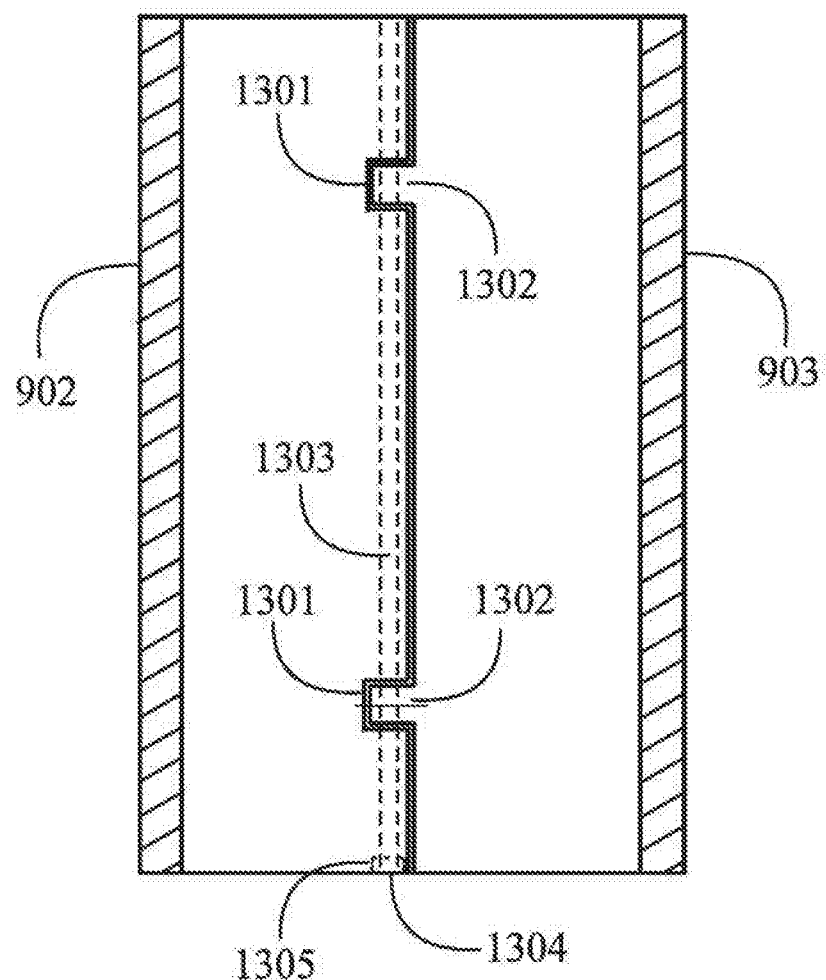
FIG. 13A is a plan view of cylinder 901 illustrating a closing mechanism in one embodiment.

FIG. 13A is a plain view of cylinder 901 illustrating a closing mechanism in one embodiment. In this implementation~the edges of half-cylinders 902 and 903 where the edges meet to close, are formed just as they are for the edges where the hinge mechanism is implemented. See notch elements 1201 and appendages 1202 in FIG. 12A, and notch elements 1301 and appendages 1302 in FIG. 13A. A single difference is in the pin 1204 for the hinge mechanism, as opposed to pin 1304 for the closing mechanism. Pin 1304, in one embodiment, passes through bore 1303 for the full length of the cylinder assembly, but has a short-threaded portion on one end that engages a female-threaded counter-bore 1305 and a screwdriver slot 1306 on the threaded end, for tightening the threaded pin in the threaded counter-bore. It should also be understood that the foam rubber elements 904, with half-cylinders closed, will exert outward pressure that will tend to aid the closure mechanism.

Figure 13B:
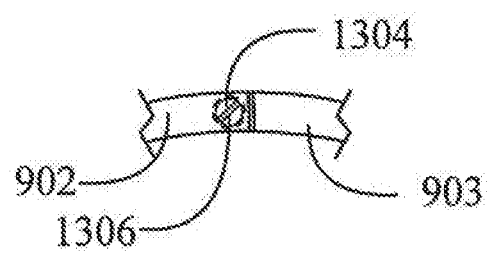
FIG. 13B is a partial end view of the closing mechanism of FIG. 13A.

As is true of the hinge mechanism described with reference to FIGS. 12A and 12B, the closing mechanism described with reference to FIGS. 13A and 13B is exemplary only. The two notched and appendage shown could in one embodiment be one each, and in other embodiments may be more than two. There may be a threaded counter-bore on each end of bore 1303, and two pins with threaded portions, one engaging from each end. Dimensions may vary as well in different embodiments.

Further to the above descriptions of hinge and closing mechanisms, the skilled person will understand that these are just examples of a wide variety of ways that hinges and closures may be implemented.

In another aspect of the present invention a hose carrier assembly is provided that is similar to that illustrated by FIG. 1, and accomplishes the same purposes, but that is implemented substantially differently. The assembly of FIG. 1 is implemented by assembling three identical frame elements, one as is shown in FIG. 3, and the assembly made as indicated in FIG. 8. In FIG. 8 it may be seen that one frame element 102, with the opening "O" facing upward, serves as a central frame element, and two additional frame elements 102 are assembled to the central frame element on each side, each with the opening "O" facing downward. The skilled artisan will understand that the facing up and facing down is arbitrary and may well be reversed.

Figure 14A:
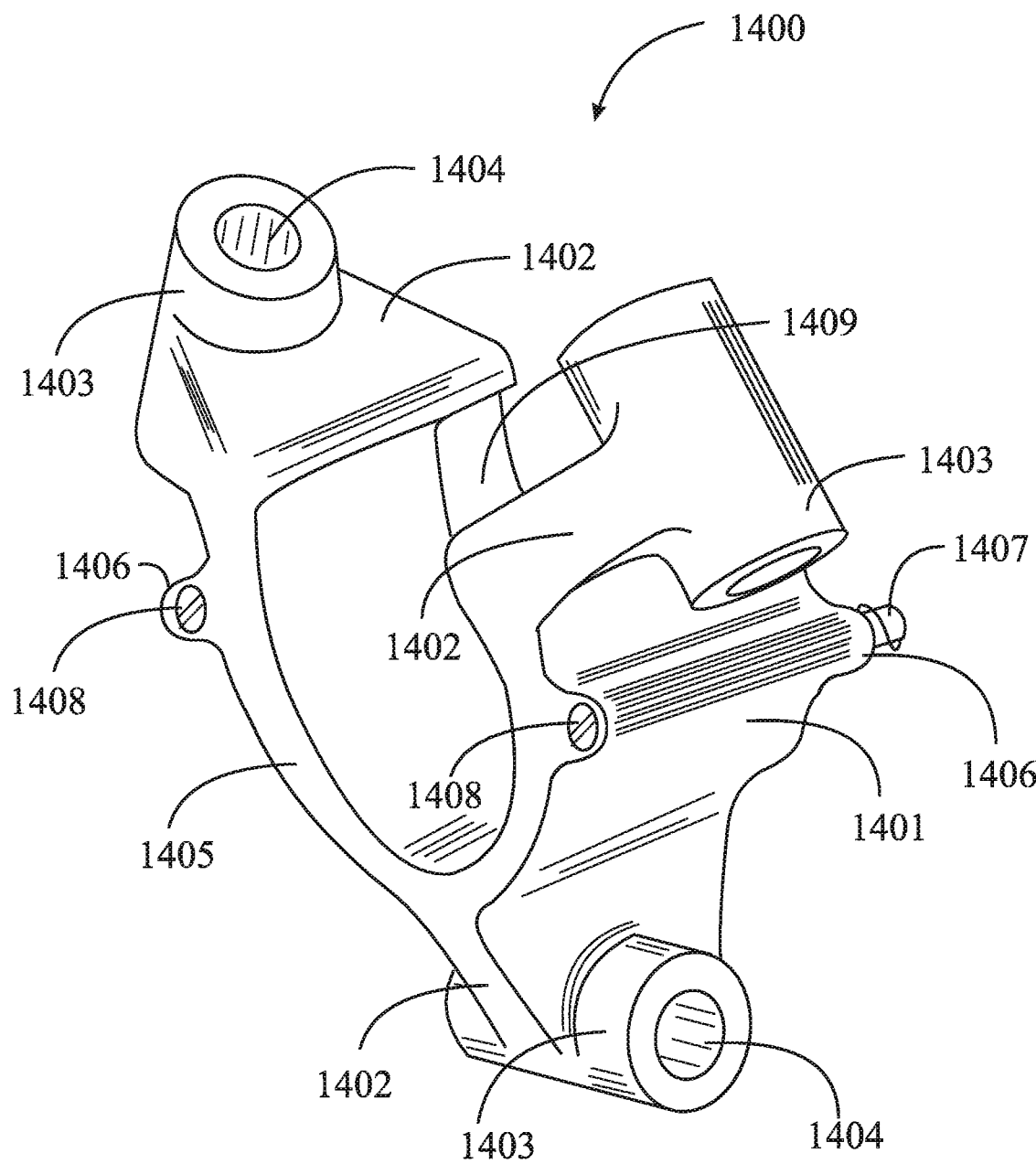
FIG. 14A is a perspective view of a frame element in an alternative embodiment of the invention.

In an alternative embodiment there are three frame elements assembled side by side, as indicated in FIG. 8, but the bases are not identical. FIG. 14A illustrates an end base frame element 1400 which has one female end, with bore 1409, and one blank end 1405, neither male or female. The counter bore 1409 is to receive a male end of a central base described more fully below.

Figure 14B:
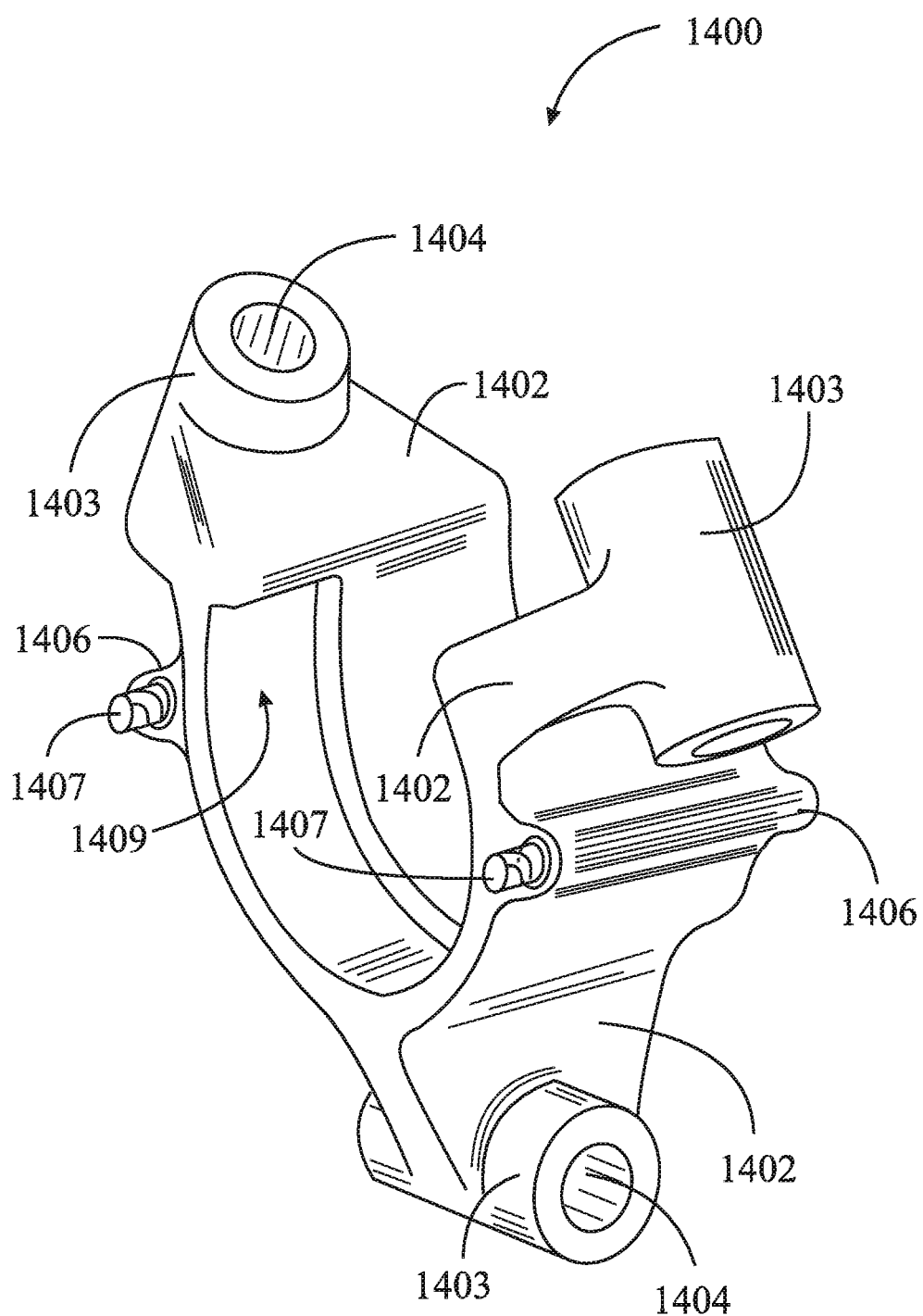
FIG. 14B is a perspective view of the frame element of FIG. 14A from an opposite viewpoint.

FIG. 14B is a view of end base frame element 1400 of FIG. 14A, as seen from an opposite viewpoint. It is the same frame element 1400 rotated around a vertical axis by 180 degrees. There are three appendages 1402 just as in the base element 102 of FIG. 3, each having a mounting element 1403 with a bore 1404 for mounting an axle for a wheel, just as described above for other embodiments.

A significant difference in this alternative embodiment is in the way the base frame elements are held together in assembly, and disassembled. In this alternative embodiment base frame element 1400 has projections 1406 parallel to the longitudinal axis of the frame element, with through holes, also parallel to the axis. There are two such projections with through holes, implemented on sides of the body 1401 of the base, at approximately 180 degrees separation. Each through hole carries a connector post 1407 that has a spiral fluted end, and a slot 1408 at the opposite end, the slot useful for turning the connector post, using a coin or other implement. In other embodiments the connector post may have turnkey panel for a user to grasp to turn the connector post.

Figure 15:
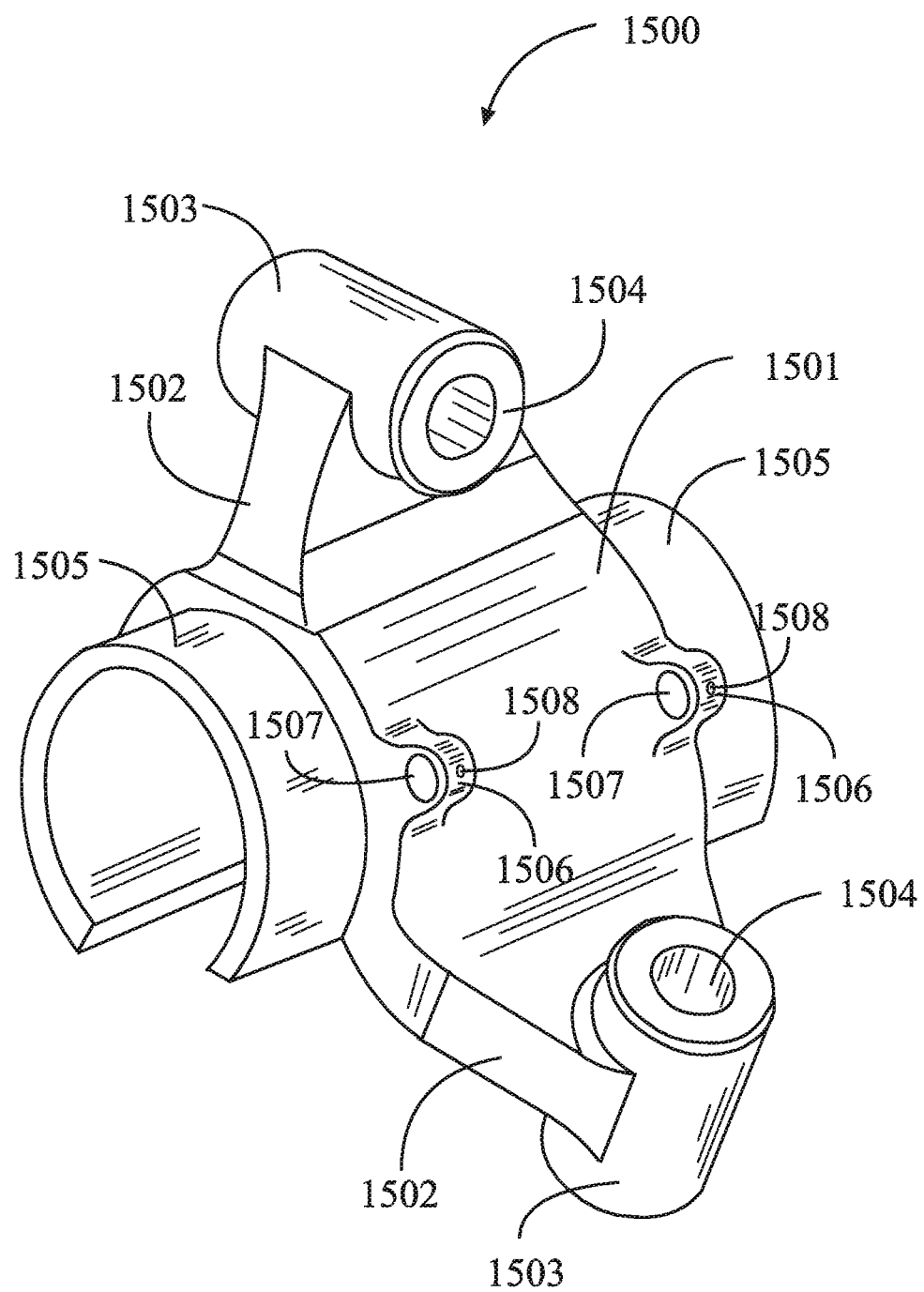
FIG. 15 is a perspective view of another frame element in an alternative embodiment of the invention.

FIG. 15 is a perspective view of a frame element 1500, having a body 1501 with two opposite male ends 1505. Frame element 1500 is a single central element used with two elements 1400 to assemble a roller assembly. Frame element 1500, like frame element 1400 and earlier frame elements described, has appendages 1502, mounting elements 1503 and axis bores 1504. There are, in addition, four short projections 1506 with holes 1507 in the direction of the axis of the frame element, having internally imposed flutes matching the flutes of posts 1407. The external flutes of posts 1407 and internal flutes of boles 1507 are in essence very course threads with a very long pitch. The external flutes of posts 1407 engage the internal flutes of holes 1507, and turning the post draws the frame elements together with a single turn of the posts. In an alternative embodiment, external and internal flutes are not incorporated.

In this alternative embodiment there are still three frame elements to make one roller assembly to carry a hose or conduit, but the frame elements are the central element 1500 with two elements 1400 assembled to each end of the central element. This order and arrangement is illustrated in FIG. 16.

Figure 16:
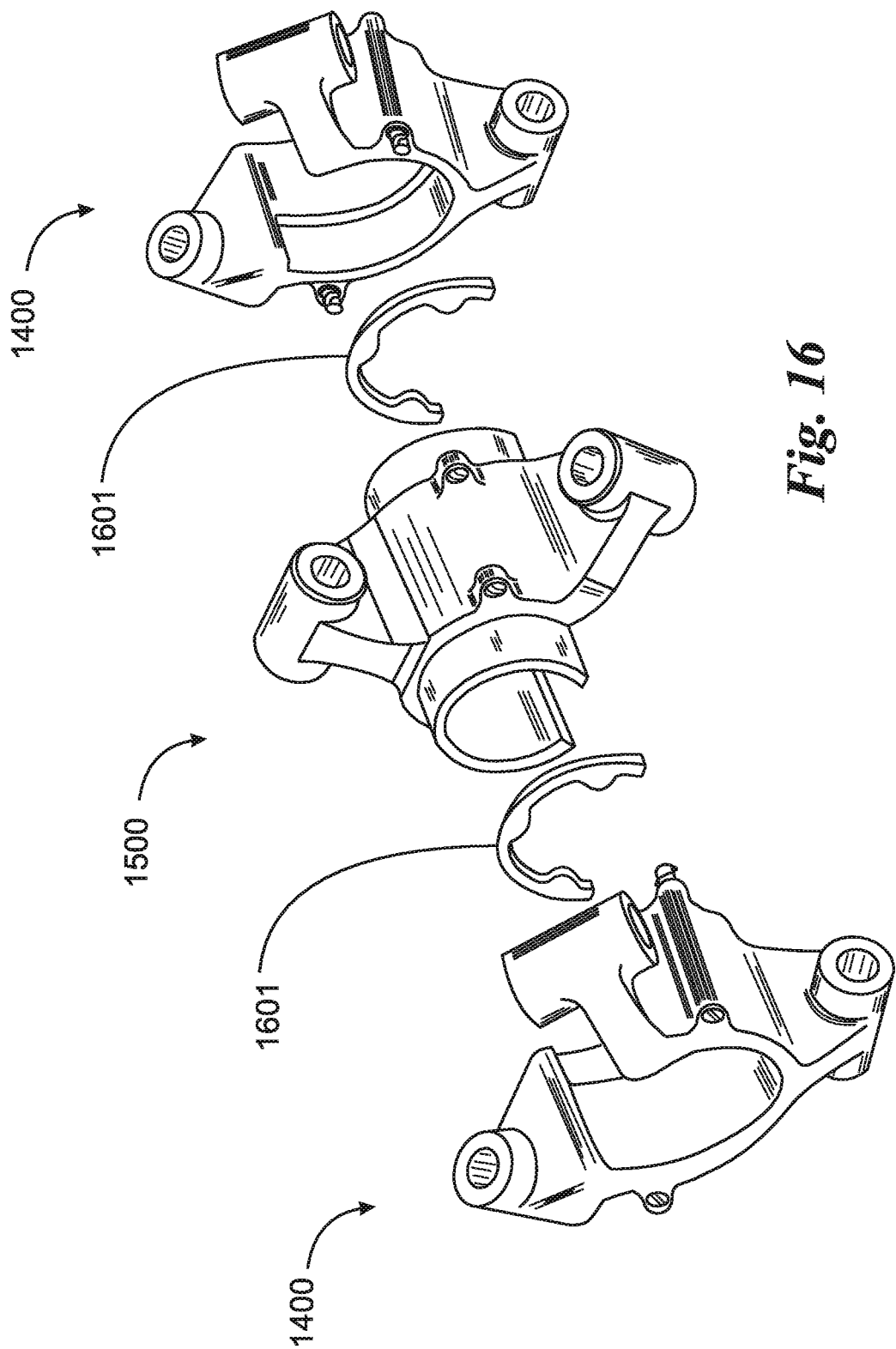
FIG. 16 is an exploded view of frame elements in an order for assembly into a roller assembly.

FIG. 16 is an exploded view of the assembly of one central frame element 1500 with two end frame elements 1400 to provide a carrier assembly analogous to assembly 100 of FIG. 1. The frame elements are shown without axles and wheels mounted to avoid unnecessary confusion in detail. The center element is frame element 1500 as seen in FIG. 15. In this exploded view frame element 1500 is shown with the opening facing downward rather than upward, and frame elements 1400 are shown with the opening facing upward. The skilled person will recognize that this is arbitrary and all three might be flipped over. In FIG. 16 gaskets 1601, analogous to gaskets 108, are shown between the base elements. When the base elements are brought together, with extensions 1505 engaging bores 1409 of the two identical end elements, posts 1407 may engage holes 1507, and the posts rotated may bring the frame elements together, and gaskets 1601 will be compressed, providing an outward force between the frame elements, which serves to lock the elements together, and also to spring them apart when the posts are turned in reverse to disassemble.

Figure 17A:
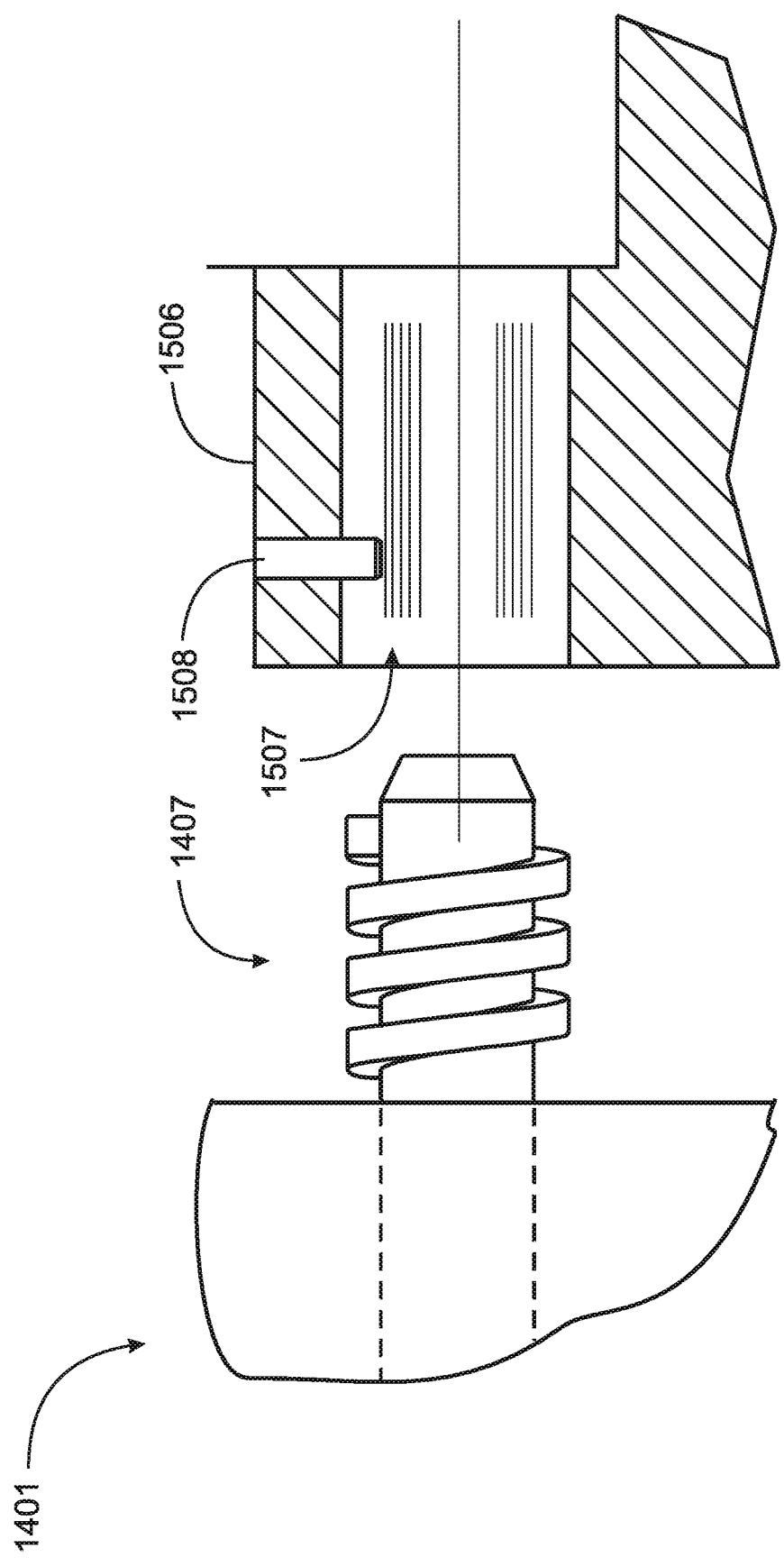
FIGS. 17A and 17B are a close up view of interaction between a post on the frame element and an associated hole.

FIG. 17A is a magnified detail of the fluted end 1407 of one of the connector posts, in line with hole 1507 in one of the projections 1506, which has a pin 1508 through the wall extending part way into hole 1507. Pin 1508 serves as a cam follower to the flutes of the post, which provide a cam action when engaged.

Figure 17B:
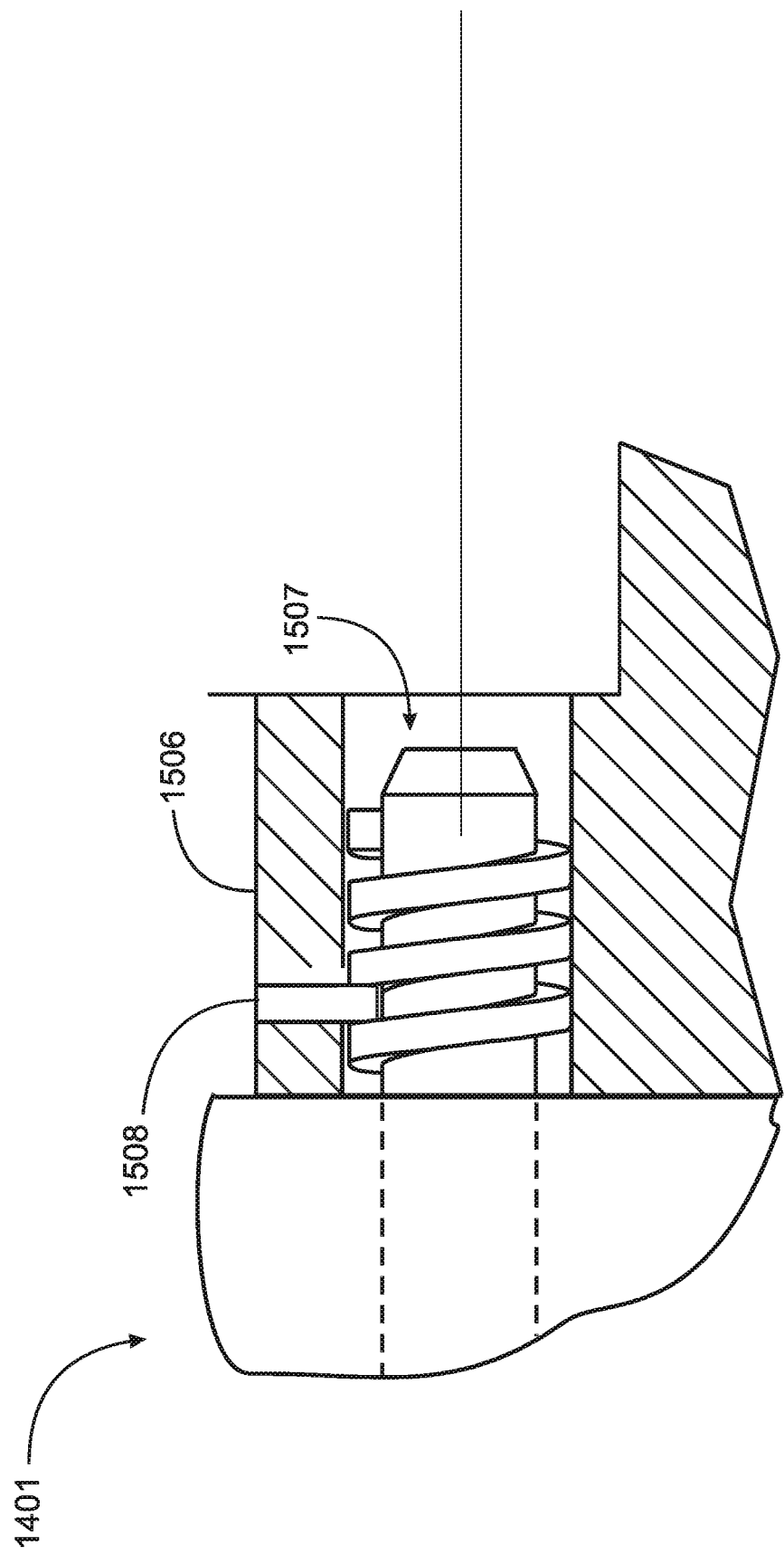

FIG. 17B is similar to 17A, but the post has been inserted into hole 1507, the post turned to engage cam follower pin 1508, and projection 1506 has been drawn into contact with body 1401 of the outer base element. In one embodiment the cam spiral is provided in a way that, when fully engaged there is a flat portion of the spiral track.

In one embodiment the pitch of the spiral track is substantially longer, which reduces the revolution of the post necessary to draw the bases together, for example, the action may be completed to a locked position in one-half turn of the post.

In yet another embodiment of the invention a different cam action mechanism may be implemented, wherein the center base element may be drawn into and locked to the outer base elements by a relatively short rotation of the base elements about the longitudinal axis.

FIGS. 18A and B illustrate a cam element 1801 having a cam track 1803 that may be implemented at four places on the center base element 1500, at the same places that projections 1506 are shown in FIG. 15. Only one position is shown, as the same cam element is implemented at the other three positions. Cam follower pins 1802 are positioned near the inner edge of each of outer bases 1400, at about 180 degrees apart, where they may engage with track 1802 in cam element 1800. The position of cam follower pins 1802 is about the position of the fluted ends of posts 1407 are shown. Referring to FIG. 18A, with an outer base 1400 positioned as shown, a distance D from inner base 1500, with cam follower pin 1802 near the entrance to track 103 of element 1802, the user may rotate the inner base and the outer base an indicated by the vertical arrows. Pin 1802 (at both positions) enters track 1803, and further relative rotation brings the bases together as shown in FIG. 18B. The same operation engaging the other end of the inner base with the other outer base adds the third base to the assembly. The bases may be disconnected by reverse rotation.

Cam elements 1801 may be added to the inner base 1500 by conventional fasteners, may be molded on in manufacture, or may be heat welded to the body of the inner base.

The skilled person will understand that cam elements 1801 must be curved to intimately engage the outer curved surface of body 1501 of inner base 1500. In one embodiment a small indention (not shown) may be implemented at the end of track 1803 to catch pin 1802 and prevent inadvertent release of the pin from the cam track.

It will be apparent to the skilled person that there may be a variety of ways to implement cam elements to engage the outer bases with the inner base, and the descriptions above are exemplary. There will be equivalent apparatus that may be implemented in other embodiments within the scope of the invention. Further, there may be many alterations in dimensions and materials, as well, other than the dimensions and materials indicated in examples thus far. The invention is thus limited only by the claims that follow.

I claim:

1. An apparatus providing rolling support for a hose or conduit, comprising:

a single first inner base frame element implemented in a substantially cylindrical shape with outward extending projections having mounting bores for carrier wheels, open on one side sufficiently to place the frame element over the hose or conduit, and having male projections extending on both ends in the direction of an axis of the cylindrical shape;

two outer base frame elements outward extending projections having mounting bores for carrier wheels, each having a side opening to accommodate the hose or conduit, and a bore in the axis direction on one end only, sized to engage one of the male projections of the inner base frame element; and cam operated mechanisms implemented proximate the ends of the inner and the outer base frame elements, enabling the base frame elements to be joined, capturing the hose or conduit, and presenting roller wheels outward upon which the hose or conduit is carried.

2. The apparatus of claim 1 wherein the inner base frame element has female bores on opposite ends, rather than the male projections, and each of the outer base frame elements has one male projection on one end.

3. The apparatus of claim 1 wherein the cam operated mechanisms comprise two connector posts implemented on each one of the outer base frame elements, the connector posts guided in bores in the direction of the axis, implemented in projections from a body of the outer base frame elements on opposite sides, the connector posts having cam fluted ends enabled to enter holes in projections on a body of the inner frame element, and to engage cam follower pins implemented in the holes, such that rotating the connector pins draws the base frame elements together.

4. The apparatus of claim 3 wherein the connector posts on an end opposite the cam fluted ends, are slotted to engage a tool for rotation of the connector posts.

5. The apparatus of claim 3 wherein the connector posts on an end opposite the cam fluted ends, have a key panel for use to grasp and turn the connector posts.

6. The apparatus of claim 1 wherein the cam operated mechanisms comprise cam elements having cam tracks implemented on an outer rim of the body of the inner base frame elements, two cam elements on each end of the inner base frame element, and on opposite sides about 180 degrees separated, the cam elements projecting outward from the end of the inner base frame element such that an entrance to each cam track is positioned to engage a cam follower pin projecting outward from the body of the outer base frame element, rotating the base frame elements serving to engage the cam roller pins in the cam tracks, drawing the inner and outer base frame elements together.

7. The apparatus of claim 6 wherein the cam elements with cam tracks are implemented on the outer base frame elements, and the cam follower pins are on the inner base frame element.

8. The apparatus of claim 1 further comprising spring gaskets placed between the inner and the outer base frame elements, compression of the spring gaskets in assembly providing force and friction in the cam elements to facilitate retention of the connection.

9. The apparatus of claim 8 wherein the spring gaskets comprise projections inward toward the hose or conduit, and facilitate use of the apparatus with hoses and conduits of differing diameters.

10. The apparatus of claim 1 wherein the inner base and each outer base have three outward extending projections with carrier wheels, with the carrier wheels oriented in a variety of orientations to provide rolling motion in the variety of directions.

* * * * *